(12) United States Patent
Wong et al.

(10) Patent No.: US 7,812,884 B2
(45) Date of Patent: Oct. 12, 2010

(54) METHOD AND DE-INTERLACING APPARATUS THAT EMPLOYS RECURSIVELY GENERATED MOTION HISTORY MAPS

(75) Inventors: Daniel W. Wong, Thornhill (CA); Philip L. Swan, Richmond Hill (CA); Daniel Doswald, Munich (DE)

(73) Assignee: ATI Technologies ULC, Markham, Ontario (CA)

( * ) Notice: Subject to any disclaimer, the term of this patent is extended or adjusted under 35 U.S.C. 154(b) by 353 days.

(21) Appl. No.: 11/875,491

(22) Filed: Oct. 19, 2007

(65) Prior Publication Data

US 2008/0036908 A1 Feb. 14, 2008

Related U.S. Application Data

(63) Continuation of application No. 10/661,181, filed on Sep. 11, 2003, now Pat. No. 7,286,185.

(51) Int. Cl.
*H04N 7/01* (2006.01)

(52) U.S. Cl. .................................... 348/452; 348/448

(58) Field of Classification Search ................ 348/448, 348/441, 451, 452, 458, 459; *H04N 7/01, H04N 11/20*
See application file for complete search history.

(56) References Cited

U.S. PATENT DOCUMENTS

| | | | |
|---|---|---|---|
| 5,159,451 A | 10/1992 | Faroudja et al. | |
| 5,233,421 A | 8/1993 | Chrisopher | |
| 5,521,644 A | 5/1996 | Sezan et al. | |
| 5,682,205 A | 10/1997 | Sezan et al. | |
| 6,459,455 B1 | 10/2002 | Jiang et al. | |
| 6,487,304 B1 | 11/2002 | Szeliski | |
| 6,570,624 B2 | 5/2003 | Cornog et al. | |
| 7,218,355 B2 | 5/2007 | Zhou et al. | |
| 2002/0054236 A1 | 5/2002 | Wredenhagen et al. | |
| 2002/0080284 A1 | 6/2002 | Kim et al. | |
| 2005/0078214 A1 | 4/2005 | Wong et al. | |

FOREIGN PATENT DOCUMENTS

EP 0690617 A2 1/1996

OTHER PUBLICATIONS

European Search Report dated Mar. 28, 2006 for European Application No. EP04255496, pp. 1-4.
Weinand, Lars; TV-Tuner und Videoschnitt: ATi All-In-Wonder Radeon 8500DV; from Tom's Hardware Guide (online); Dec. 11, 2001; pp. 1-2.
Weinand, Lars; Neue Mainstream-Klasse: Radeon 9000 (RV250); from Tom's Hardware Guide (online); Jul. 18, 2002; pp. 1-5.
ATI Technologies; White Paper Radeon Digital Video; from www.ati.com; Jun. 14, 2000; pp. 20.
Yoshida, Junko; "Philips new chip said to remove LCD TV artifacts"; EE Times; Jul. 8, 2003; pp. 1-2; www.eetimes.com/sys/news/OEG20030708S0017.

*Primary Examiner*—Sherrie Hsia
(74) *Attorney, Agent, or Firm*—Vedder Price P.C.

(57) ABSTRACT

A de-interlacer includes recursive motion history map generating circuitry operative to determine a motion value associated with one or more pixels in interlaced fields based on pixel intensity information from at least two neighboring same polarity fields. The recursive motion history map generating circuitry generates a motion history map containing recursively generated motion history values for use in de-interlacing interlaced fields wherein the recursively generated motion history values are based, at least in part, on a decay function.

13 Claims, 10 Drawing Sheets

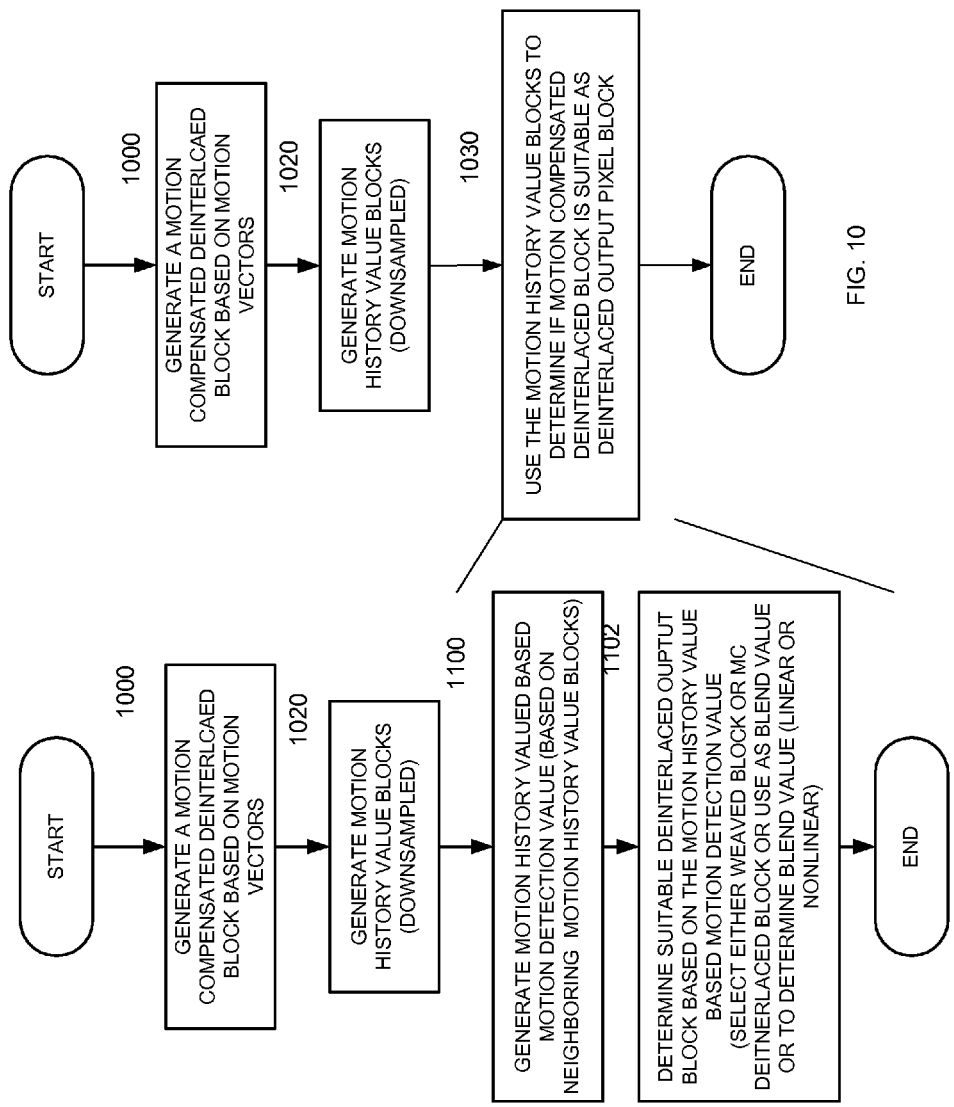

METHOD AND DE-INTERLACING APPARATUS THAT EMPLOYS RECURSIVELY GENERATED MOTION HISTORY MAPS

RELATED APPLICATIONS

This application is a continuation of U.S. application Ser. No. 10/661,181, filed Sep. 11, 2003, now U.S. Pat. No. 7,286,185, entitled "METHOD AND DE-INTERLACING APPARATUS THAT EMPLOYS RECURSIVELY GENERATED MOTION HISTORY MAPS", having as inventors Daniel W. Wong et al., and owned by instant assignee and is incorporated herein by reference.

FIELD OF THE INVENTION

The invention relates generally to methods and apparatus for de-interlacing interlaced video, and more particularly, to methods and apparatus that de-interlace interlaced video using motion detection and/or motion estimation techniques.

BACKGROUND OF THE INVENTION

For computer monitors that are mostly non-interlaced or progressive type display devices, video images or graphic images must be displayed by sequentially displaying each successive line of pixel data sequentially for a frame of an image. In contrast, inter-laced display devices, such as conventional television displays, typically display images using even and odd line interlacing.

The process of producing one progressive frame on every incoming interlaced field is called de-interlacing. When such interlaced signals are received for display in a progressive display, such as a computer display or other suitable display, picture quality problems can arise especially when motion is occurring in the picture where inferior methods of de-interlacing are used.

A problem may exists for personal computers or other devices having multi media capabilities since interlaced video information received from conventional video tapes, cable television broadcasters, digital video discs and digital broadcast satellite systems must typically be de-interlaced for suitable display in a progressive display device.

Many de-interlacing techniques are known. In general, one method for de-interlacing interlaced fields is to use a motion detection technique which examines already decoded pixel information to determine whether motion has occurred and as a result, the suitable type of de-interlacing technique to apply. As such, de-interlacing using motion detection techniques is some times referred to as motion adaptive filtering wherein different filtering strategies (de-interlacing techniques) or algorithms are used in picture areas in a display with and without motion. Generally, intra-frame de-interlacing is used in picture areas with motion and field merging (weaving) is used in picture areas without motion. Coefficients in adaptive filters are based on motion detection functions. However, known motion adaptive filtering techniques may use memory to store four fields of information to evaluate. However this limited amount of information can result in improper motion detection. Using twice the memory to get eight fields of information would be too costly. As such, a more efficient motion adaptive de-interlacing technique would be desirable. Another technique is to use motion vectors that are embedded in an encoded video stream, such as an MPEG encoded stream to detect motion and de-interlace encoded video information. For example, the motion vectors and decoded pixel intensities are typically used to determine whether motion exists on a per pixel block basis.

One type of motion detection mechanism for de-interlacing sequential lines of video is described in U.S. Pat. No. 5,521,644 entitled, "Mechanism for Controlled Interlacing Sequential Lines of Video Data Field Based Upon Pixel Fields Associated With Four Successive Interlaced Video Fields," having an inventor Sezan et al. In this example, motion detection is used as a precursor to select the value for each missing pixel of a de-interlaced frame, the frame is generated by using four consecutive fields to produce a motion detection map that is coupled to a de-interlacer. The motion detection map is subsequently coupled to a de-interlacer, together with a selected two of the four consecutive fields. The two selected fields and the motion map are used to characterize a resulting de-interlaced frame. As such, in the absence of motion, pixel values of an odd field and its immediately succeeding even field are merged. On the other hand if motion is detected, vertical interpolation is carried out for the even field, by a linear combination of immediately adjacent pixels, respectively above and below the pixel of interest. One problem with this described methodology is that the motion maps do not take into account pixel values for more than two consecutive same polarity fields. As such, the memory maps do not take into account historical changes over time of multiple same polarity fields. This system also appears to require a large amount of memory to store a plurality of motion maps for each group of two same polarity fields.

Two interpolation techniques are often involved in de-interlacing, these are temporal interpolation and spatial interpolation. Temporal interpolation creates the missing pixels using pixels that were incorrect in time but have the correct spatial coordinates. Temporal interpolation (e.g. weave) is typically best suited if the video sequence consist of static images but does not work well with moving video. Spatial interpolation (e.g. bob) creates missing pixels using pixels that are correct in time but have incorrect spatial coordinates. Techniques vary from simply averaging the pixels above and below the missing pixel to more elaborate methods that utilize many nearby pixels in order to derive edge orientation and reproduce edges without jagged artifacts. It is also known to control a blend of spatial versus temporal interpolation along, for example, edges of detected motion.

Graphics processors, which are typically coprocessors that operate in conjunction with a host CPU or other processor, are known to employ de-interlacing functions. However, additional memory may be required to store a suitable type of fields for motion estimations. In addition, separate de-interlacing chips are also available. Typically, graphics processors include 3D engines that generate graphics information that may be overlaid on video, such as "windows," and in addition may have 3D engines that render 3D images for games based on drawing commands that cause the rendering of 3D objects from vertex information. Such devices are typically used in multi media devices such as lap top computers, hand-held devices, desk top devices, set top boxes, and other suitable devices. As such, it would be desirable to have a de-interlacing technique compatible with graphics processors or implemented as discreet logic or suitably employable in other architectures that would attempt to reduce the amount of memory required in comparison with other motion estimation de-interlacing techniques.

As noted above, common de-interlacing techniques include applying a "bob" when up-sampling from a current field to a field missing pixels. In areas of strong motion and to apply a weave operation (mixing two fields to fill a missing pixel) in still areas. Typical hardware solutions can limit the number of fields available to save on memory costs but may use complex logic to detect motion and de-interlace fields.

BRIEF DESCRIPTION OF THE DRAWINGS

FIG. 10 is a flow chart illustrating one example another method of de-interlacing interlaced fields of video to produce an image frame in accordance with one embodiment of the invention; and FIG. 11 is a flow chart illustrating one example of another method of de-interlacing interlaced fields of video to produce an image frame in accordance with one embodiment of the invention.

DETAILED DESCRIPTION OF THE PREFERRED EMBODIMENT

Figure 1:
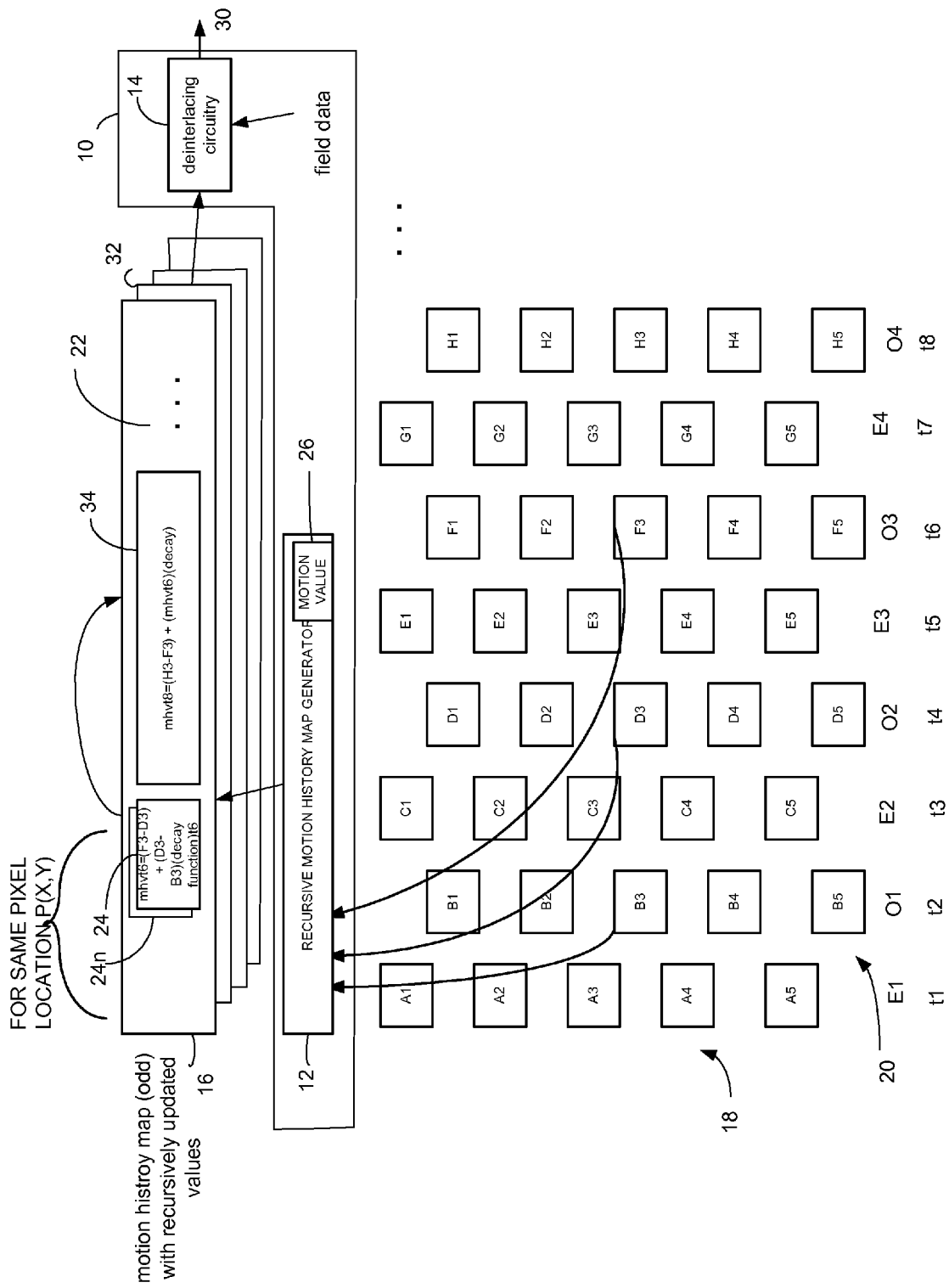
FIG. 1 is a block diagram illustrating one example of a de-interlacing apparatus in accordance with one embodiment of the invention.

A de-interlacer includes recursive motion history map generating circuitry operative to determine a motion value associated with one or more pixels in interlaced fields based on pixel intensity information from at least two neighboring same polarity fields. The recursive motion history map generating circuitry generates a motion history map containing recursively generated motion history values for use in de-interlacing interlaced fields wherein the recursively generated motion history values are based, at least in part, on a decay function.

The de-interlacer also includes de-interlacing circuitry that utilizes the recursively generated motion history values stored in the motion history map to provide de-interlaced output pixel information. In one embodiment, the recursive generation motion history values are used to detect motion and to select whether weaved pixel should be used as the de-interlace technique. The application of the decay function allows for the continued recursively updated motion history values to be dampened over time. The decay function (such as a decay value) may be selected as desired to provide a faster or slower rate of decay and may be a linear or non-linear function as desired. In addition, preferably, pixel information from three same polarity fields plus optional referencing to neighboring pixels or motion values from opposite polarity fields are used to determine a motion value.

Also in one embodiment, the motion history values are generated for each pixel in the image frame. In another embodiment, the motion history values are generated for a group of pixels such as an N×N block of pixels. The motion history values are produced by repeatedly adding a detected pixel intensity difference of neighboring same plurality fields, as additional fields are available, to the existing motion history value in the motion history map, which is decayed in part each iteration. Based on the recursively generated motion history values, it is determined whether to use for example a weave operation to obtain an output pixel, or a bob operation or a suitable blend of both. As such, motion is detected by inspecting a change in pixel intensities over time.

In one example, the three motion values are obtained by taking two from opposite fields and one from the same field. The contribution from motion history map values are applied to a decay function before being added with intensity changes that have been detected between two same polarity fields.

In another embodiment, an older (e.g. previous) motion history map is saved and used to determine which de-interlacing technique to apply to produce de-interlaced pixel information. For example, an even current recursively generated motion history map is generated based on even field information, and an odd current recursively generated motion history map is generated based on odd field information, and at least one of the previous even and odd recursively generated motion history maps is saved when a new current recursively generated motion history map is generated. The even current recursively generated motion history map, the odd current recursively generated motion history map, and a previously generated motion history map are used to determine an appropriate de-interlacing operation. As such, a de-interlacing technique selection value is generated to select which type of de-interlacing (spatial or temporal or combination thereof) to apply or how much of each to blend with one another.

In another embodiment, the de-interlacer uses the recursive motion history map information in addition to motion compensated de-interlaced pixel information (such as that which has been generated based on motion vectors) to determine whether motion compensated de-interlacing information should be used as the output pixel information or whether weaved pixel data should be used or a combination thereof. Accordingly, an enhanced still image circuit uses recursively generated motion history values to determine whether already motion compensated de-interlaced pixel information or group of pixels is suitable as the output pixel information for an image frame. Such a technique effectively combines both motion estimation techniques and motion compensation techniques in a manner that can provide improved still image quality.

FIG. 1 illustrates one example of a de-interlacer 10 which includes recursive motion history map generating circuitry 12, de-interlacing circuitry 14, and memory 16 which contains motion history maps on an even field and odd field basis in this example. Also shown are even and odd fields 18 and 20 that are available at different times t1 through t8. The recursive motion history map generating circuitry 12 is operative to determine a motion value on a pixel by pixel basis in this example, or group (block) of pixel basis, if desired. The recursive motion history map generating circuitry 12 and de-interlacing circuitry 14 may be implemented using any suitable structure including software, hardware, firmware or any suitable combination thereof.

The recursive motion history map generating circuitry 12 determines a motion history value associated with one or more pixels in the interlaced fields 18 or 20 based on pixel intensity information from at least two neighboring same polarity fields. For example, two even fields or two odd fields. In this example, the recursive motion history map generating circuitry 12 determines the motion value 26 corresponding to B3 over time. The sequence of motion values generated at that location over time is shown as motion value 26. The motion values may be determined by taking the absolute value of the difference between pixel intensity values from neighboring same polarity fields. The recursive motion history map generating circuitry 12 generates a motion history map 22 continuing a motion history value corresponding to each pixel or a group of pixels, on an odd field and even field basis or may generate a motion history map on a frame basis by combining the odd and even field history map data. As noted, if desired, it may generate the motion history map on a per block basis as opposed to a per pixel basis if desired. The motion history map 22 contains recursively generated motion history values 24-24n, in this example for each pixel in the field, for use in de-interlacing interlaced fields. The recursively generated motion history values 24-24n are based, at least in part, on a decay function.

As shown in this example, a motion value 26 is determined by comparing an absolute difference of pixel intensity values of pixels at the same location in two neighboring same polarity fields B3 and D3. A decay function is then applied to this motion value 26 and then added to a motion value based on another neighboring same polarity field, in this example, F3 as later described. As such, the motion history map is not a conventional motion history map but includes recursively generated motion history values 24 which are continually updated and based on a decay function. The de-interlacing circuitry 14 evaluates the recursively generated motion history values 24-24n to determine an appropriate de-interlacing technique (e.g. weave, bob, combination thereof or other suitable technique) to produce a de-interlaced output pixel 30. On the arrival of a new incoming field, the recursive motion history map generating circuitry 12 iteratively overwrites previously stored recursively generated motion history values in memory 16 in response to evaluating each additional adjacent same polarity field or in other words in response to determining another motion value 26.

The memory 16, which may be any suitable storage element, includes motion history values for even fields and odd fields in the form of the motion history map. The de-interlacing circuitry 14 is operative to provide adaptive de-interlacing on a per pixel or block of pixel basis, based on the recursive generated motion history map values 24-24n such that at least one of temporal and spatial filtering is provided to produce output pixels for the image frame.

Figure 2:
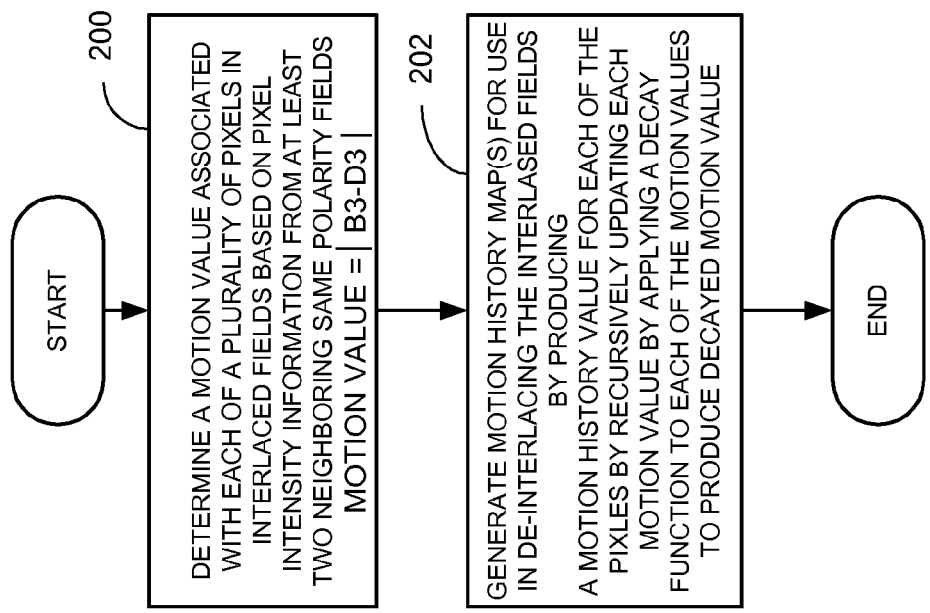
FIG. 2 is a flow chart illustrating one example of a method for de-interlacing interlaced fields of video to produce an image frame in accordance with one embodiment of the invention.

FIG. 2 illustrates one example of a method of de-interlacing interlaced fields of video to produce an image frame in accordance with one embodiment of the invention. As shown in block 200, the method includes determining the motion value associated with each of a plurality of pixels, or a group of pixels, in interlaced fields based on pixel intensity information from at least two neighboring same polarity fields. As shown, suitable logic (hardware, software or firmware) may be employed to determine the absolute difference between pixel intensities of the same pixel locations in neighboring same polarity fields, designated as the new motion value 24, with respect to that pixel location. As shown in block 202, the method includes generating the motion history maps by producing motion history values 24 for each of the pixels (or groups of pixels) by recursively updating previous motion history values by applying a decay function to each of the motion values to produce a decayed motion value. This may be represented by the following formula where |(F3−D3)| is the new motion value: motion history value=|(F3−D3)|+(|(D3−B3)|*(decay function)).

A more robust solution can be obtained by inspecting also neighboring motion history values from the opposite field. Motion is detected by inspecting change in pixel intensities over time. In one embodiment, three existing motion values are taken into consideration to produce the motion history value, two from the opposite field (at the pixel locations where bob is taking values from) and one from the same field (at the pixel locations where weave is taking value from). To minimize motion bleeding, the minimum motion history value from the opposite fields should be used. When combining the values from the two fields, the maximum can be taken. The contribution from motion history maps then goes through a decay function before adding with intensity change detected. One example may be represented by the equations (x and y are defined in frame coordinates):

a) history(x, y)=max(min(motion history value(x, y−1), motion history value(x, y+1), motion history value(x, y))

b) diff(x, y)=abs(next(x, y)−previous(x, y))

c) motion history value(x, y)=clamp(decay(history(x, y))+diff(x, y)); as an example, at t4, the motion value detected for pixel corresponding to A3 uses E3 as next and C3 as previous. If desired history(x,y)=max(history(x,y), motion history value(x,y).

Without blending, a more aggressive decay function can be used such that the solution is more responsive to motion. For example:

$$decay(v)=v*motionDecayFactor+motion DecayBias$$

where motionDecayFactor is in the range between 0 and 1 while motionDecayBias is in the range of −1 and 1.

Figure 3:
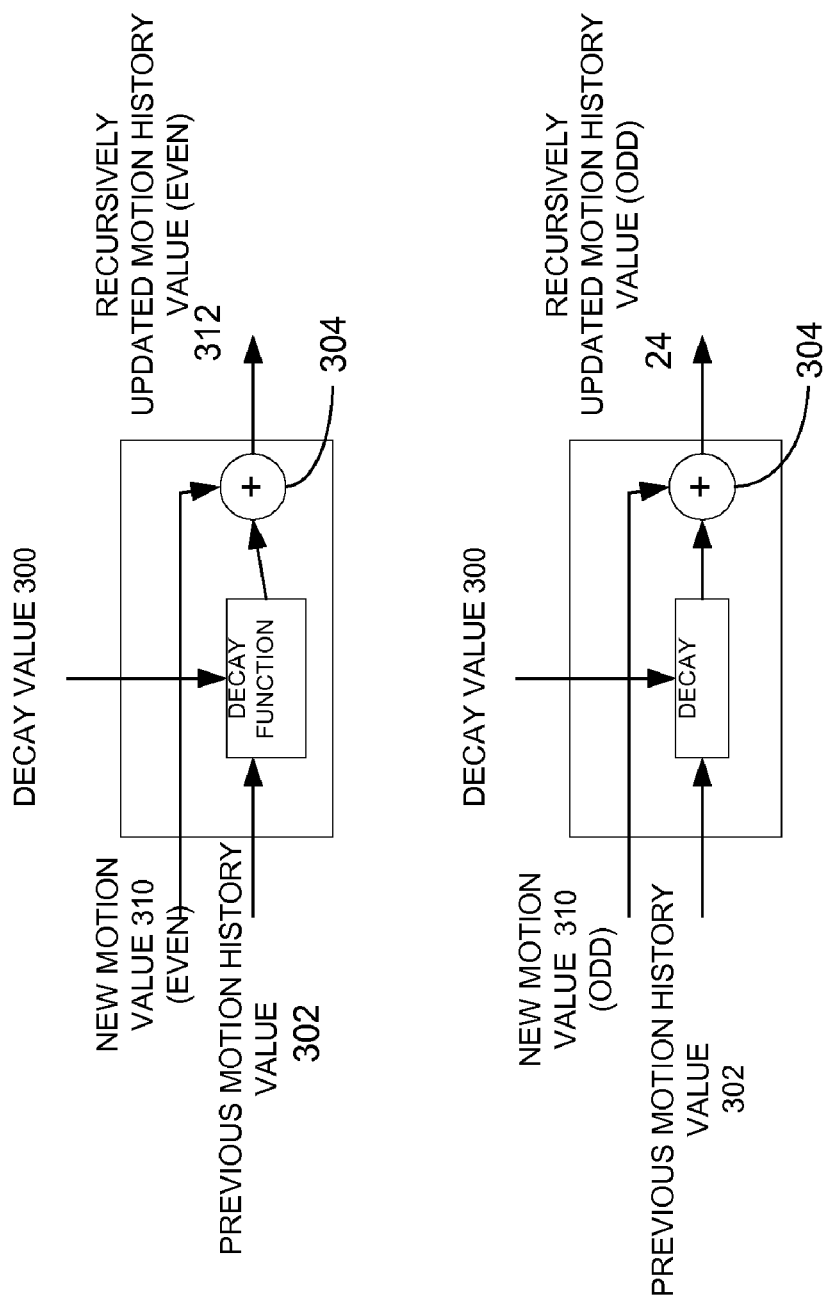
FIG. 3 is a block diagram illustrating the production of recursively generated motion history values based on a delay function in accordance with one embodiment of the invention.

Referring also to FIG. 3, the decay function may be, for example, a decay value 300 which may be a constant which may be a non-linear or linear variable decay value as desired and which may be varied as desired. The decay function may include, for example, an alpha blending value to indicate for example the percent of an old motion history value to combine with a new value and it may also represent the subtraction of some constant decay value from the stored motion history value or any other suitable decay function. A previous motion history value is decayed by the decay function and added by a summing operation 304 with a new motion value to produce the recursively updated motion history value. Hence, each previous motion history value is recursively updated. In this example, the recursive motion history map generating circuitry 12 includes a finite impulse response (FIR) filter to provide the recursively updated motion history values. As shown, a similar operation is used for both even and odd motion history maps and as such, a previous motion history value based on even field pixel intensities is decayed and then added with a new motion value 310 corresponding to, for example, an absolute difference between pixel intensities of neighboring even fields. This produces the recursively updated motion history value 312 associated with even fields and may be stored, for example, in motion history map 32 (see FIG. 1). As such, producing motion history values includes adding a detected pixel intensity difference from neighboring same polarity fields to the existing decayed motion value wherein the detected pixel intensity difference is based on pixel intensity information from a next neighboring same polarity field.

Figure 4:
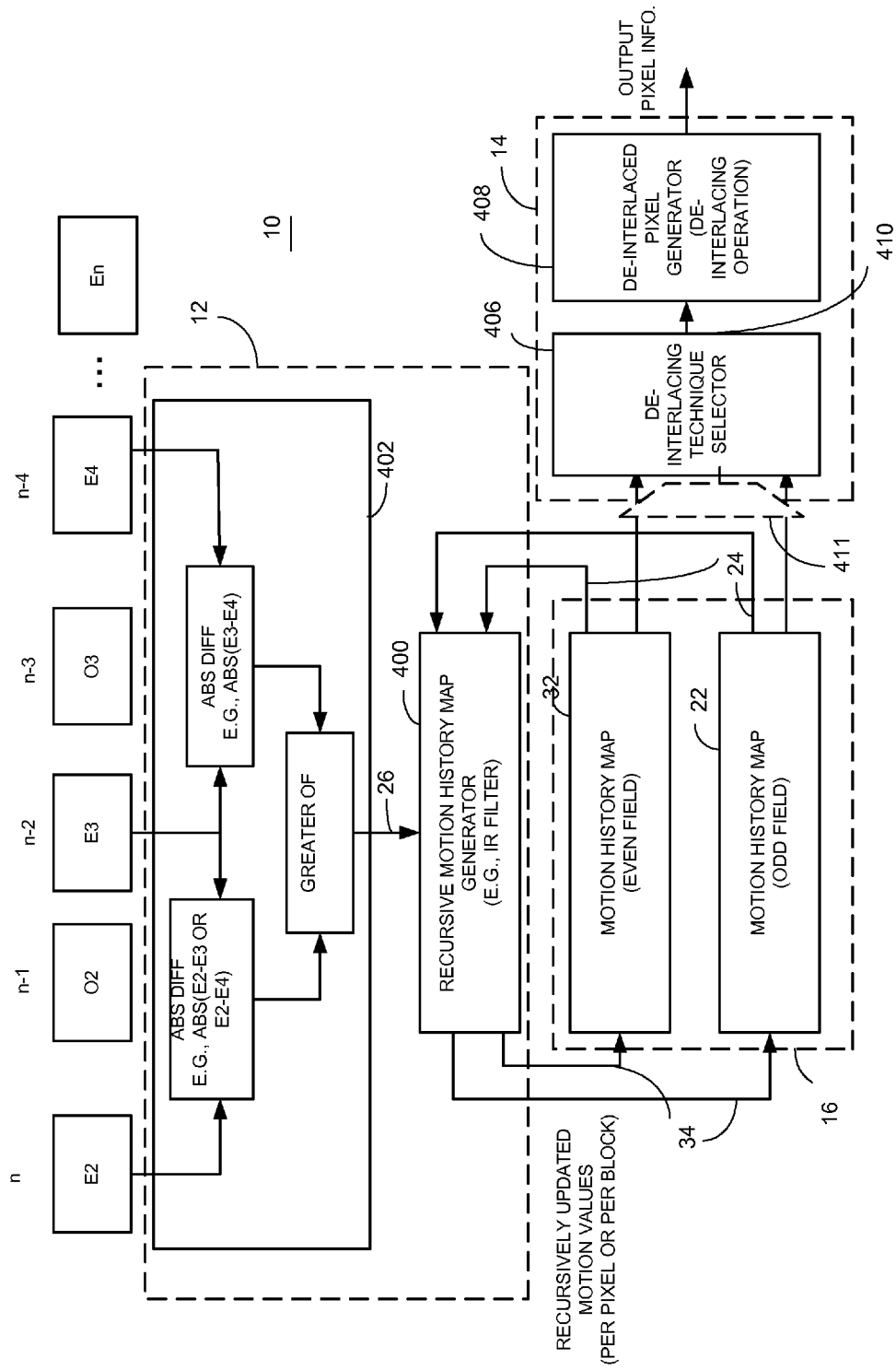
FIG. 4 is a block diagram illustrating one example of a de-interlacer to de-interlace interlaced fields to produce an image frame in accordance with one embodiment of the invention.

FIG. 4 is a block diagram functionally illustrating a more detailed example of a de-interlacer 10 wherein the recursive motion history map generating circuitry 12 includes a recursive motion history map generator 400, such as an impulse response filter and a new motion value estimator 402 that produces the motion values 26.

In addition, although two motion history value determinators are shown, it will be recognized that the same hardware may be reused such that the motion history values associated with the even fields may be determined and the same hardware may then be used to determine the odd field motion history values. As shown, the new motion value estimator 402, in this example, evaluates a minimum of three pixels from three same polarity fields and chooses the greater of the absolute difference between each of the resulting two absolute difference comparisons. The recursive motion history map generator 400 then uses the new motion value 26 to generate a new motion history value 34 (see also FIG. 1). The previous motion history value for that same pixel location, namely motion history value 24, is used to generate the updated motion history value 34. As such, a decay function is applied to the previous motion history value and a new motion value 26 is then added thereto to produce the recursively generated motion history value 34.

The de-interlacing circuitry 14 includes a de-interlacing technique selector 406 and a de-interlaced pixel generator 408 to produce the output pixel information for display on a display device. A multiplexor 410 is illustrated in dash lines to indicate that, if desired, either one of the even motion history maps 32 or the odd motion history map 22 may be used individually to indicate which de-interlacing technique to use. Alternatively, both motion history maps may be used such that motion history values associated with even fields and odd fields may be used to determine which de-interlacing technique to select. The de-interlacing technique selector 46 evaluates the motion history value and provides control information 410 to control the de-interlaced pixel generator 408 to provide, for example, a weave or bob operation to produce the output pixel. The control information 410 may serve as a de-interlacing technique selection value to select which type of de-interlacing technique to use. That is to say, to choose amongst bob, weave and blend.

Figure 5:
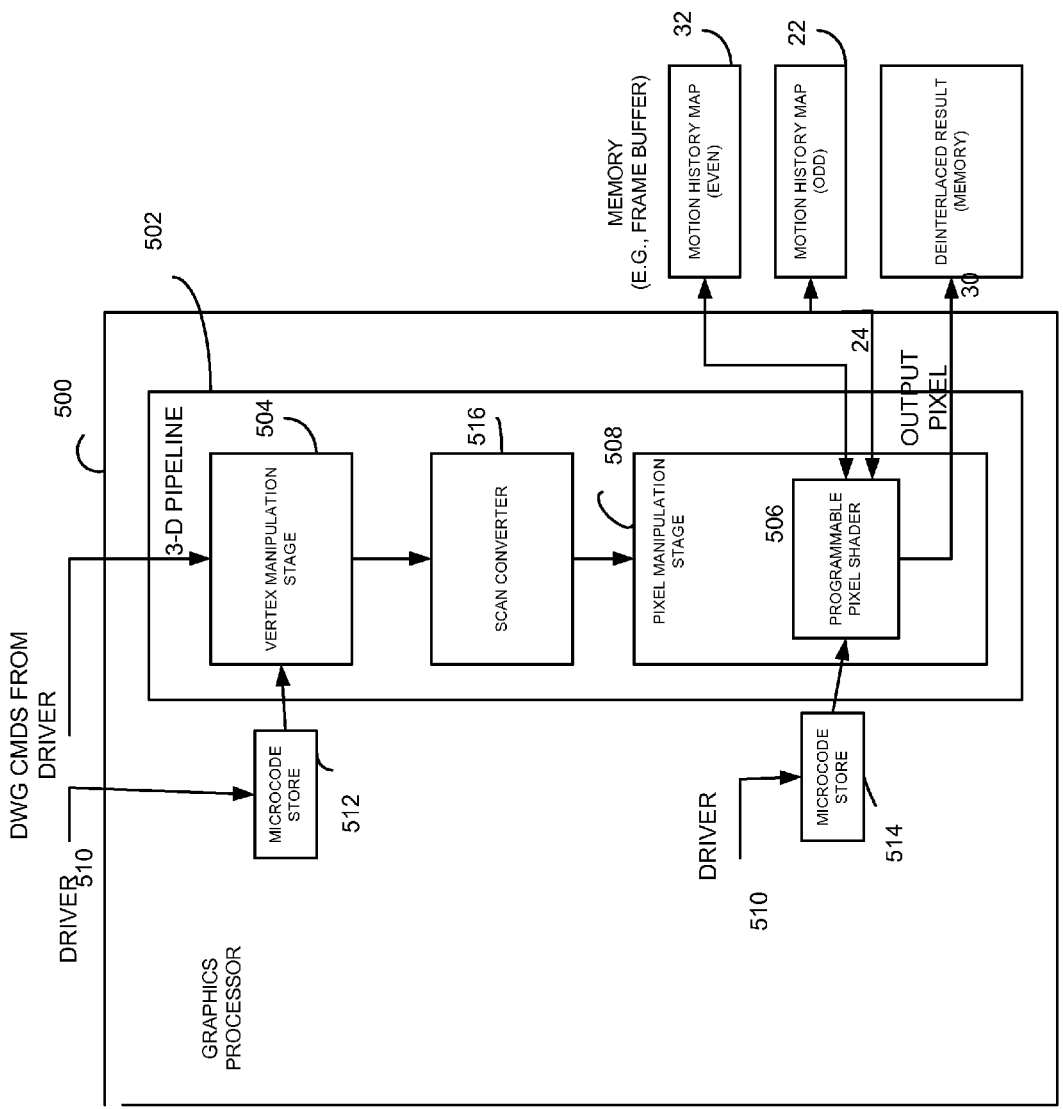
FIG. 5 is a block diagram illustrating one example of a graphics processor employing a de-interlacer for interlacing fields of video to produce an image frame in accordance with one embodiment of the invention.

FIG. 5 illustrates one example of a graphics processor 500 employing a de-interlacer as part of a 3D pipeline 502. As shown, the 3D pipeline 502 includes a plurality of programmable shaders 504 and 506. Programmable shader 504 serves as a vertex manipulation stage and programmable shader 506 serves as a programmable pixel shader as part of a pixel manipulation stage 508. Each of the programmable shaders may be programmed by a driver executing, for example, on a host processor (not shown) to provide instructions in the form of micro code instructions 510 which are stored in micro code storage elements 512 and 514. It will be recognized that the micro code storage may be the same memory. In addition, the motion history map memory may be part of a frame buffer, system memory, or chip local memory, or any other suitable memory as desired. For missing pixels, a simple approach is to bob when motion is large and weave when motion is small.

alpha(x, y)=motion(x, y)>motion Threshold1:0 bob(x, y)=average(curr(x, y−1),curr(x, y=1))

weave(x, y)=next(x, y)

pixel(x, y)=weave(x, y)+(bob(x, y)−weave(x, y))×alpha (x, y)

A 3D pipeline, as know in the art, also includes a scan converter 516 which effectively breaks down tasks for the pixel manipulation stage 508. The programmable shader 506 is programmed under control of the driver (and hence, the host processor) to carry out the operations of the de-interlacer as described herein. As such, the programmable shader 506 is programmed to operate as recursive motion history map generating circuitry to determine a motion value on a pixel or a group of pixel basis, associated with each of a plurality of pixels in interlaced fields based on pixel intensity information from at least two neighboring same polarity fields. The programmable shader is also programmed to generate the motion history maps containing recursively generated motion history values for use in de-interlacing interlaced fields wherein the recursively generated motion history values are based at least in part on a decay function. This is as previously described. The programmable shader, as part of the pixel manipulation stage, has access to the pixel level field information and as such, can de-interlace respective fields in response to the recursively generated motion history values to provide de-interlaced output pixel information 30. Hence, the programmable shader operates as the de-interlacer described above. As known in the art, the 3D pipeline receives drawing commands from the driver to, in a normal operation, render objects based on primitives. However, in this embodiment, the 3D pipeline is instead used as a de-interlacer. In particular, the programmable shader 506 is programmed by the driver to operate as a de-interlacer that generates and utilizes motion history values that are based on a decay function.

Figure 6:
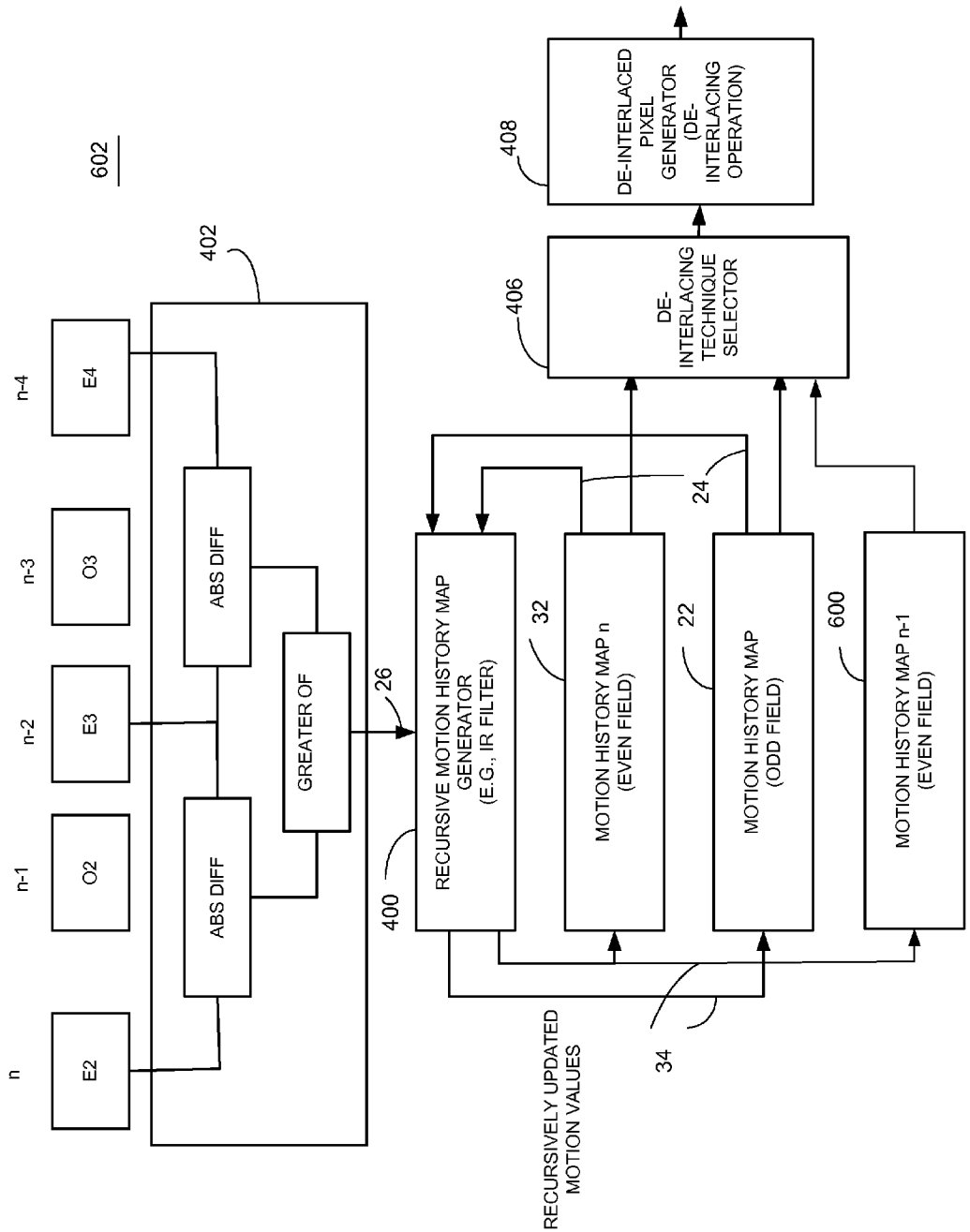
FIG. 6 is a block diagram of an alternative embodiment of a de-interlacer for de-interlacing interlaced fields of video to produce an image frame in accordance with another embodiment of the invention.

FIG. 6 illustrates another example of a de-interlacer that uses a previously generated motion history map 600 which is saved prior to being overwritten so that motion history map values from two same polarity field motion history maps and an opposite polarity history map are used to provide a further improvement in detecting what motion has occurred for a given pixel or block of pixels. As such, an even current recursively generated motion history map is generated based on even field information, such as motion history map 32, and odd current recursively generated motion history map is generated based on odd field information and a previously generated motion history map 600 is saved which may be either even or odd depending upon the stage in the process. The previously generated motion history map 600 is saved when a new current recursively generated motion history map for the same field polarity is generated. The de-interlacer 602 uses the combination of the even current recursively generated motion history map, the odd current recursively generated motion history map 22, and the previously generated motion history map 600 to determine an appropriate de-interlacing operation.

Figure 7:
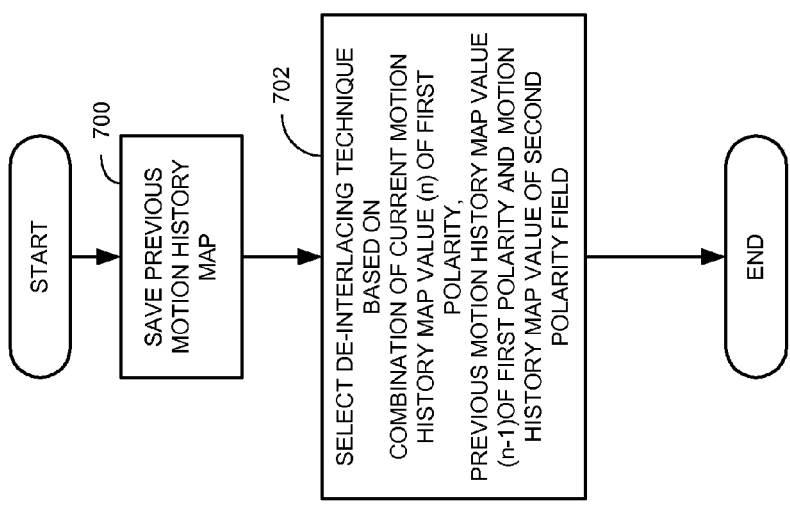
FIG. 7 is a flow chart illustrating one example of a method of de-interlacing interlaced fields of video to produce an image frame in accordance with another embodiment of the invention.

For example, as shown in FIG. 7, the previous motion history map is saved as shown in block 700. A method for de-interlacing then includes selecting the de-interlacing technique based on the combination of the current motion history map value of a first plurality, the previous motion history map value of the first plurality and a motion history map value of the second polarity field as shown in block 702. As such, a further spatial comparison may be made. The de-interlaced technique weighting value is based on three motion history value components in the example shown in FIG. 6

Figure 8:
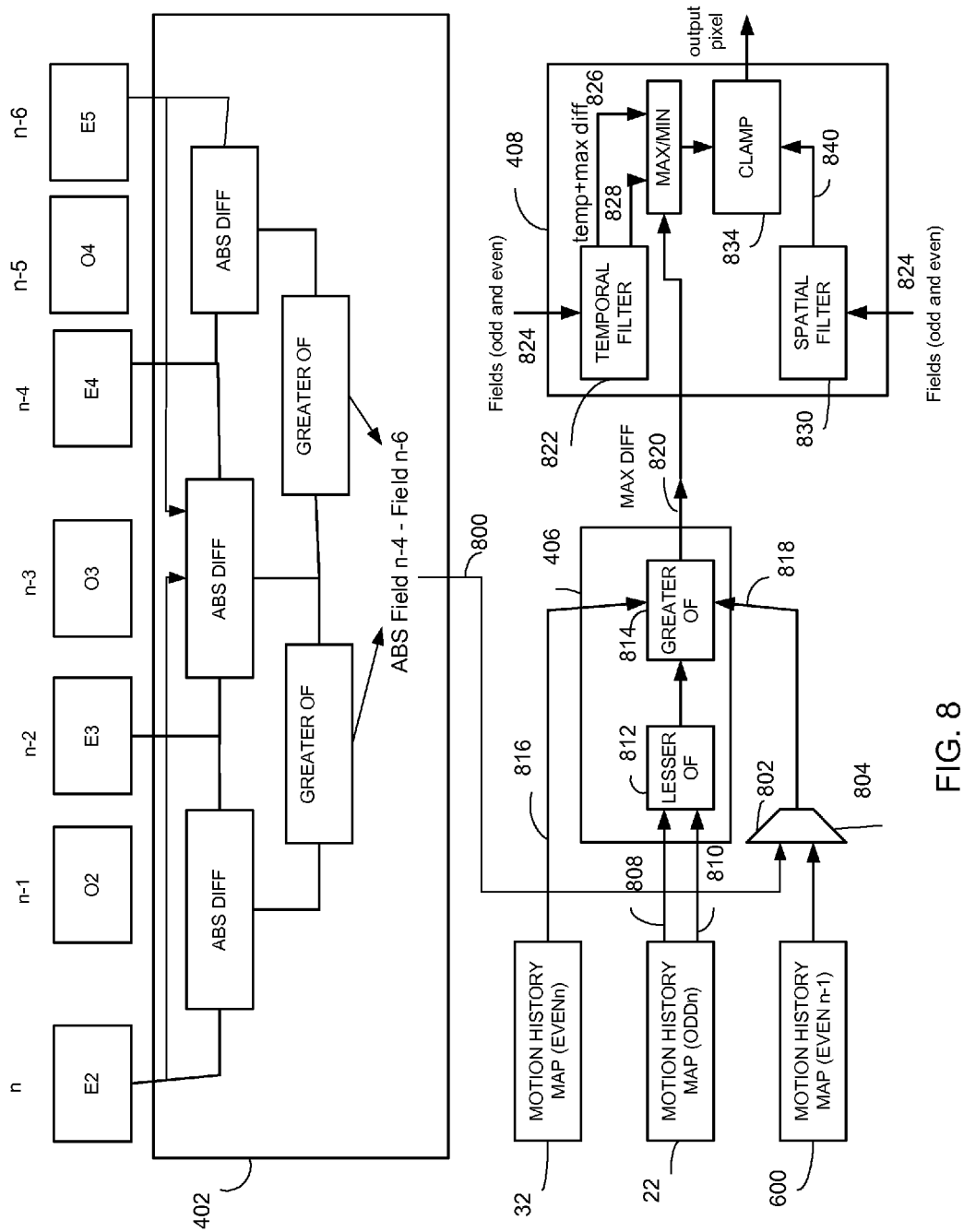
FIG. 8 is a block diagram illustrating in more detail an example of the de-interlacer shown in FIG. 6.

FIG. 8 illustrates another example of a de-interlacer employing information from five fields and that utilizes a saved previously generated motion history map 600 and shows in greater detail one example of a de-interlacing technique selector 406 and de-interlacing pixel generator 408 shown in FIG. 6. Also shown in this example, instead of using a previously stored motion history map that contains recursively generated motion history values, a current motion value 800 may be selected to compare with a current motion history map, if desired. This may be done, for example, through a switching operating functionally shown as multiplexor 802 which may be controlled or switched by suitable switching logic 804 to use the motion value 800 instead of the saved motion history map 600. However, for purposes of this illustration, an example will be explained with reference to use of the previous motion history map value of a first polarity in combination with the current motion history map value of the first polarity and a motion history map value of a second polarity field. Also, for purposes of illustration in this example, a per pixel motion history value will be used, however, it will be recognized that motion history values for a group of pixels shows a per block motion history value motion history map may also be utilized if desired.

As shown, the de-interlacing technique selector 406 compares a motion history value from a motion history map corresponding to a recursively generated motion history value 808 at a pixel location in a line above a pixel of interest as shown and a motion history value 810 at a pixel location a line below. The comparison logic then compares the motion history values to determine which of the motion history values 808 and 810 is less than the other. The lesser of the two motion history values is then passed to operation 814 to determine the greater value between the output of operation 812 and the motion history values corresponding to left and right pixels designated 816 and motion history values from corresponding motion history values from a saved previous motion history map shown as motion history values 818. The result is the maximum motion history value maximum difference 820.

Stated another way, MaxDiff(x, y, t−1)=max(motion(x, y, t), min(motion(x, y−1, t−1), motion(x, y+1, t−1)), motion(x, y, t−2)); where (x, y−1) indicates a location approximately (but not necessarily directly) above the position (x, y) and (x, y+1) indicates a location approximately (but not necessarily directly) below the position (x, y). The exact locations can be offset based on ancillary information about the image if desired. For example: MaxDiff(x, y, t−1)=max(motion(x, y, t), min(motion(x−dx, y−1, t−1), motion(x+dx, y+1, t−1)), motion(x, y, t−2)) would be a possible variation.

The de-interlacing circuitry 408 uses a temporal filter 822 to, for example, weave corresponding even and odd fields 824 and for the pixel location of interest, generates the temporally generated pixel value, designated TEMP, which is then added with the maximum difference value 820 to give a threshold value 826. Similarly, the resulting temporally generated pixel intensity value is reduced by the maximum difference value 820 to form a lower threshold 828. The de-interlacing circuit 408 also includes a spatial filter 830 which may, for example, perform suitable spatial interpolation (such as a bob operation) and outputs the spatially generated pixel information 840 to a clamp circuit 834. As such, the de-interlacer circuit generates a temporally interlaced pixel value referred to as TEMP, generates a spatially interpolated pixel value shown as 840 and generates a maximum allowable difference threshold 826 and 828 between an output pixel value 842 and temporally de-interlaced pixel value TEMP based on the motion history map values in motion history maps 32, 22 and 600. The clamp circuit 834 uses the spatial interpolated pixel value 840 as the output pixel 842 if the spatially interpolated pixel values within a value range between the temporally de-interlaced pixel value plus or minus the maximum allowable difference 820. Otherwise, the clamp circuit clamps the spatially interpolated pixel value 840 to the closer of the temporally interlaced pixel value plus the maximum allowable difference 826 or clamps to the lower threshold, namely, the temporally interlaced pixel value minus the maximum, and uses the clamped pixel value as the output pixel value 842.

Figure 9:
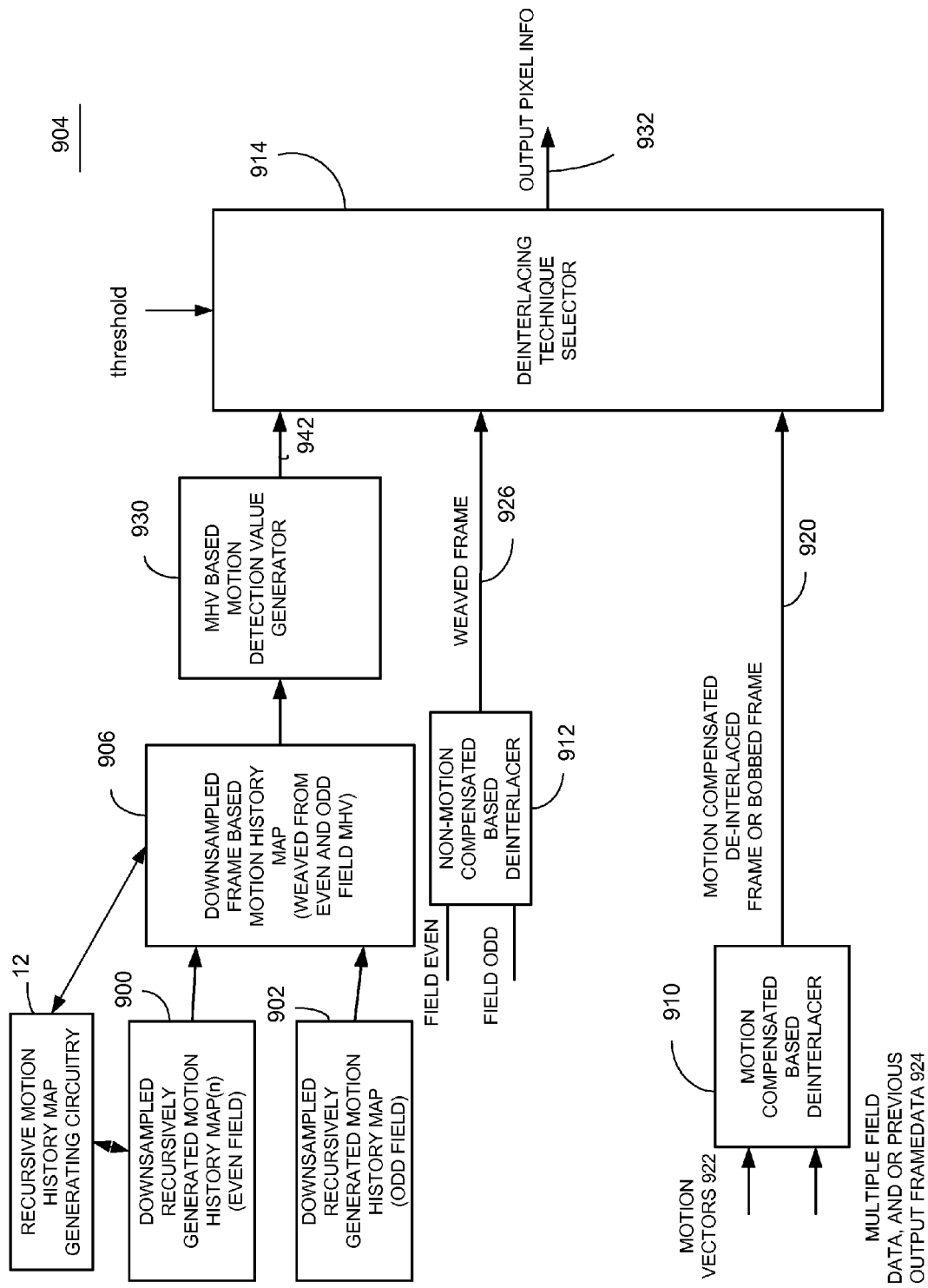
FIG. 9 is a block diagram illustrating a de-interlacer in accordance with another embodiment of the invention.

Referring to FIGS. 9-11, a method and apparatus is disclosed that provides the de-interlacing of interlaced fields to produce an image frame that selects between motion compensated de-interlaced pixel information and non-motion compensation de-interlaced information, based on motion history values that were recursively generated and stored in the motion history maps. In addition, in this embodiment, the motion history maps are down sampled recursively generated motion history maps shown as 900 and 902 wherein, for example, a 2×2 pixel block is used as the group of pixel size to reduce the amount of memory needed to store motion history value information. Any suitable block size may be used, including single pixels. As such, the de-interlacer 904 utilizes recursive motion history map generating circuitry 12 to generate the down sampled recursively generated motion history maps 900 and 902, which may then be weaved to form a down sampled frame-based motion history map 906 that may be stored in memory. The de-interlacing circuit 904 also includes a motion compensation-based de-interlacing circuit 910, a non-motion-based de-interlacing circuit 912, and a de-interlacing technique selector 914 operatively coupled to combine or select between output from the motion compensated de-interlacing circuit 910 and the non-motion compensated circuit 912.

The motion compensation-based de-interlacing circuit 910 generates a motion compensated de-interlaced pixel or group of pixels 920 based on motion vectors 922 (e.g., indicating length and direction) and corresponding field data 924 from, for example, an MPEG stream or based on previous fields and/or previous output frames or from any other suitable motion vector estimator. The non-motion compensation-based de-interlacing circuit 912 generates weaved pixel data 926 from even and odd field data to produce a weaved pixel or weaved group of pixels designated 926.

The de-interlacing circuit 904 also includes a motion history value based motion detection value generator 930 which uses the recursively generated motion history values to determine whether the motion compensated de-interlacing pixel or group of pixels 920 is suitable as output pixel information 932 for the image frame. The motion history value based motion detection value generator 930 uses stored motion history values to generate a motion history value-based motion detection value 942. The motion history value-based motion detection value 942 is based on the plurality of neighboring recursively generated motion history values obtained from the down-sampled motion history maps and a previous recursively generated down-sampled motion history value from the motion history maps. The de-interlacing circuitry 914 uses the motion history value-based motion detection value 942 to determine a suitable de-interlaced output pixel or group of pixels 932 by indicating whether a blend of non-motion compensated de-interlaced pixel information 926 should be blended with motion compensated de-interlaced pixel information 920 or which of the non-motion compensated or motion compensated de-interlaced information should be used as the output pixel information.

As such, still image enhancement is provided by comparing the motion history value-based motion detection value to a threshold to determine whether to output a weaved frame or a motion compensated frame as an output frame. This may be done on a block by block basis. The weaved information and motion compensated de-interlaced information may also be blended depending upon how close the value 942 is to a threshold, as it may be desirable to perform a partial bob and weave along an edge of detected motion.

As such, the method of operation shown in FIGS. 10 and 11 includes generating a motion compensated de-interlaced block (such as information 920) based on motion vectors as shown in block 1000, generating down-sampled recursively generated motion values as shown in block 1020 and as shown in bock 1030, using the motion history value blocks to determine if motion compensated de-interlaced block is suitable or if the weave block is suitable or if a suitable combination of the two should be used as a de-interlaced output pixel block 932. It will be understood that although the various methods described herein have been described as being performed by certain functional blocks, that any suitable function block may perform the requisite steps as desired depending upon a particular application.

As shown in FIG. 11, using the motion history value blocks to determine if motion compensation should be performed may include generating the motion history value-based motion detection value 942 based on neighboring motion history value blocks about a pixel of interest. As such, a motion history value corresponding to a block of pixels below, to the left, to the rights, above and next to the left and right pixels (e.g. all motion values of blocks surrounding a block of interest) are evaluated to determine whether the block of interest includes motion. This may be done by comparing absolute values of motion history values or any other suitable techniques described herein. As such, as shown in block 1100, the generation of the motion history value-based motion detection value is based on the neighboring motion history value blocks as opposed to original field intensity values. As shown in block 1102, the de-interlacing circuitry determines the suitable de-interlaced output block based on the motion history value-based motion detection value 942. For example, the de-interlacing operation selects either a weaved block or motion compensated de-interlaced block as the output pixel block or uses a blend value to suitably blend the weave block with the motion compensated de-interlaced block. As such, the above-described apparatus and method employs not only a recursively generated motion history values for motion estimation, but also utilizes recursively generated motion history values to determine motion and utilizes motion vector-based motion compensation de-interlacing and determines whether to use the motion compensated de-interlaced block as the output block or to use a non-motion compensated de-interlaced block as an output block or a suitable blend of the two.

In this example, output frames are created in the current design by using a down-sampled (one value for each 2×2 pixel block) motion history map to select for every (2×2) region between weaving corresponding fields (for the case of no motion) or using a MC de-interlacing algorithm. For every frame, a motion history value is calculated using intermediate motion history values (horizontal down-sampled ×2) from the current and previous frames. Intermediate motion history values are calculated using temporal (e.g. previous) and spatial (e.g. above, below, left, right) neighboring motion history values as well as the corresponding motion history values from the previous and next input fields. Since additional output errors should be avoided, the non-moving areas of each motion history value and its intermediate motion history value can be reduced by up to 3 pixels horizontally and 2 pixels vertically. This makes sure that transitions from moving image to still image are handle by the motion compensation de-interlacer and therefore no additional errors are introduced with this additional enhancement. An example for calculation of the motion history value based motion detection value is represented as follows:

$$\text{mhm}\_{tmp}(x, y) = \max(\max(\min(\text{imhm}\_{prev}(x, y-1), \text{imhm}\_prev(x, y+1)), \text{imhm}\_prev(x, y)), \text{imhm}(x, y));$$

$$\text{mhm}(x, y) = \max(\text{mhm}\_{tmp}(x+1, y), \text{mhm}\_{tmp}(x, y), \text{mhm}\_{tmp}(x-1, y))$$

whereas: x, y are incremented by 2 over the whole image (and (x,y−1) is the pixel below etc.), x starts at 0 and y at 0 or one depending on the input field polarity, imhm is the down-sampled frame based motion history map 906, imhm_prev is the previous downsampled frame based motion history map 906, mhm_imp is an intermediate value to make the equations more readable and mhm is the motion history value based motion detection value 942 used to decide if the motion compensated de-interlaced output, weaved frame or blended output should be used.

Advantages of the above method and apparatus include, but are not limited to, for example an efficient use of storage where the equivalent of well more than four fields of information may be stored in the memory space normally used to store four fields of information. In addition, an adaptive motion estimation scheme and if desired, a motion compensation scheme may be combined with a motion estimation scheme in the manner described which employs the use of recursively generated motion history values. As such, output video images may be generated that more accurately detect motion in an efficient manner and provide improved and crisper images.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. An apparatus comprising:
   a display; and
   a de-interlacer operative to de-interlace interlaced fields to produce an image frame comprising:
   recursive motion history map generating circuitry operative to determine a motion value, on a pixel by pixel or group of pixel basis, associated with one or more pixels in the interlaced fields based on pixel intensity information from at least two neighboring same polarity fields; and operative to generate a motion history map containing recursively generated motion history values for use in de-interlacing the interlaced fields wherein the recursively generated motion history values are based at least in part on a decay function; and
   de-interlacing circuitry operatively responsive to the recursively generated motion history values that are based at least in part on the decay function, and operative to provide de-interlaced output pixel information for display by selecting a suitable de-interlacing technique from a plurality of different techniques based on the motion history map, to produce the image frame.

2. The apparatus of claim 1 wherein the motion history map includes data representing motion history values for even fields and odd fields and including memory containing the motion history map values.

3. The apparatus of claim 1 wherein the de-interlacing circuitry is operative to provide adaptive de-interlacing on a pixel or block of pixel basis, based on the recursively generated motion history map values such that at least one of temporal and spatial filtering is provided to produce output pixels for the image frame.

4. The apparatus of claim 1 wherein the recursive motion history map generating circuitry overwrites previously stored recursively generated motion history values in memory in response to evaluating each additional adjacent same polarity field.

5. A method of de-interlacing interlaced fields of video to produce an image frame comprising:
   determining a motion value, on a pixel by pixel or group of pixel basis, associated with each of a plurality of pixels in the interlaced fields based on pixel intensity information from at least two neighboring same polarity fields;
   generating a motion history map containing recursively generated motion history values for use in de-interlacing the interlaced fields wherein the recursively generated motion history values are based at least in part on a decay function such that:
      an even current recursively generated motion history map is generated based on even field information,
      an odd current recursively generated motion history map is generated based on odd field information;
      saving the even and odd current recursively generated motion history maps; and
      using the even current recursively generated motion history map, the odd current recursively generated motion history map and the previously generated motion history map to select an appropriate de-interlacing operation from a plurality of different de-interlacing operations.

6. The method of claim 5 including:
   generate a temporally interlaced pixel value;
   generating a maximum allowable difference between an output pixel value and the temporally de-interlaced pixel value, based on the motion history map values;
   generate a spatially interpolated pixel value; and
   use the spatially interpolated pixel value as the output pixel if the spatially interpolated pixel value is within a value range between the temporally de-interlaced pixel value plus or minus the maximum allowable difference, otherwise clamp the spatially interpolated pixel value to the closer of the temporally interlaced pixel value plus the maximum allowable difference or the temporally interlaced pixel value minus the maximum and use the clamped pixel value as the output pixel value.

7. A method of de-interlacing interlaced fields of video to produce an image frame comprising:
   determining a motion value, on a pixel by pixel or group of pixel basis, associated with each of a plurality of pixels or group of pixels in the interlaced fields based on pixel intensity information from at least two neighboring same polarity fields;
   generating a motion history map containing recursively generated motion history values for use in de-interlacing the interlaced fields wherein the recursively generated motion history values are based at least in part on a decay function;
   generating a motion compensated de-interlaced pixel or group of pixels based on motion vectors; and
   using the recursively generated motion history values to determine whether the motion compensated de-interlaced block is suitable as output pixel information for the image frame, wherein using the recursively generated motion history values includes generating a motion history value based motion detection value for a pixel of interest, or group of pixels of interest, based on a plurality of neighboring recursively generated motion history values and a previous recursively generated motion history value from the motion history map and using the motion history value based motion detection value to select one of a plurality of different de-interlacing processes to produce the image frame.

8. The method of claim 7 wherein generating a motion history map includes generating a down-sampled frame based motion history map containing weaved decayed motion values corresponding to even fields information and odd fields information; and wherein the method includes generating weaved block data from even and odd field data to produced a weaved block and wherein using the motion history map to determine whether the motion compensated de-interlaced block is suitable as output pixel information for the image frame includes comparing the motion history value based motion detection value to a threshold value and selecting at least one of:
   the weaved block data and the motion compensated de-interlaced block as an output pixel block.

9. The method of claim 8 including varying the threshold based on a determined noise level.

10. The method of claim 8 wherein selecting at least one of: the weaved block data and the motion compensated de-interlaced block as an output pixel block includes blending the weaved block data and the motion compensated de-interlaced block.

11. A de-interlacer operative to de-interlace interlaced fields to produce an image frame comprising:
   recursive motion history map generating circuitry operative to determine a motion value, on a pixel by pixel or group of pixel basis, associated with each of a plurality of pixels in the interlaced fields based on pixel intensity information from at least two neighboring same polarity fields; and operative to generate a motion history map containing recursively generated motion history values for use in de-interlacing the interlaced fields wherein the recursively generated motion history values are based at least in part on a decay function; and
   de-interlacing circuitry operatively responsive to the recursively generated motion history values that are based at least in part on the decay function and operative to provide de-interlaced output pixel information, including:
   a motion compensation based de-interlacing circuit operative to generate a motion compensated de-interlaced pixel or group of de-interlaced pixels based on motion vectors;
   a non-motion compensation based de-interlacing circuit operative to generate weaved pixel data from even and odd field data to produce a weaved pixel or group of weaved pixels; and
   a de-interlacing technique selector circuit operative to use the recursively generated motion history values to select the weaved pixel or group of weaved pixels, or the motion compensated de-interlaced pixel or group of de-interlaced pixels for the image frame.

12. The de-interlacer of claim 11 wherein the de-interlacing circuitry includes a motion history value based motion detection value generator operative to generate a motion history value based motion detection value for a pixel of interest, or group of pixels of interest, based on a plurality of neighboring recursively generated motion history values and a previous recursively generated motion history value from the motion history map and using the motion history value based motion detection value to determine a suitable de-interlaced output pixel or group of de-interlaced output pixels.

13. The de-interlacer of claim 11 wherein the recursive motion history map generating circuitry generates a down-sampled frame based motion history map containing weaved decayed motion values corresponding to even fields information and odd fields information; and wherein the de-interlacing technique selector compares the motion history value based motion detection value to a threshold value and selects based on the comparison.

* * * * *